United States Patent Office 2,720,464
Patented Oct. 11, 1955

2,720,464

METHOD OF PREPARING COLD-WATER-SOLUBLE POWDERED CELLULOSE ETHERS

Arthur W. Anderson and Bernhard V. Moeller, Midland, Mich., assignors to The Dow Chemical Company, Midland, Mich., a corporation of Delaware No Drawing. Application October 24, 1952,
Serial No. 316,768

4 Claims. (Cl. 106—197)

This invention relates to a method of preparing compositions of cellulose ethers which compositions in dry form will dissolve readily in cold water.

Although cellulose ethers such as methyl cellulose and the so-called water-soluble forms of ethyl cellulose, which normally form gels in hot water, are ordinarily described as being soluble in cold water, it is well known that it is necessary to treat these ethers with hot water for from 20 to 30 minutes before they can be satisfactorily dispersed or dissolved in cold water. Such difficultly soluble fibrous cellulose ethers are herein referred to, in the conventional manner, as cold-water-soluble cellulose ethers. The described indirect procedure for preparing cold-water solutions of the cold-water-soluble cellulose ethers is obviously time-consuming, expensive, and otherwise disadvantageous in many manufacturing operations wherein aqueous compositions comprising these ethers are made. Thus, it is frequently necessary to prepare the solution of the cellulose ether separately from the solution or suspension of other ingredients of a desired composition, and then to mix the two to form the final composition. The necessity of following such a procedure also precludes, in many instances, the possibility of preparing mixtures of the dry cold-water-soluble cellulose ethers with other dry materials, such as water-soluble dyes and pigments, and of preparing aqueous solutions or suspensions therefrom, especially since many of the substances which it is desirable to mix with the dry ether are affected adversely by contact with hot water.

Various procedures have been tried with little success in attempting to prepare the cellulose ethers in a form which may be dissolved directly in cold water. Thus, it has been proposed to "grind," shred or otherwise subdivide the ether particles to increase their rate of solution. However, the fibrous forms of the cellulose ethers are difficult to grind or shred, and the finely divided material is little, if any, more easily dissolved in cold water than the unground material. The fibrous cellulose ethers, regardless of their state of subdivision, are not easily wetted by cold water. They float on the surface when added to cold water, and, when stirred with cold water, they tend to form into soft lumps, balls or nodules, which it is practically impossible to disperse in cold water. It has also been proposed to dry aqueous solutions of the cellulose ethers and then to grind the dried product. However, the resultant ground material dissolves only extremely slowly in cold water and the method is incapable of practical industrial application. Reference is also made to U. S. patents of R. W. Swinehart and A. T. Maasberg Nos. 2,331,864 and 2,331,865, wherein is described the preparation of cellulose ethers in a form easily dissolved in cold water.

It is, therefore, an object of the present invention to provide a method of preparing compositions comprising a cold-water-soluble cellulose ether which normally exhibits gel formation in hot water, which compositions in dry form, dissolve readily in cold water.

An additional object is to provide a method of preparing the aforesaid cellulose ether compositions in a dry, powdered form which may be mixed with other dry materials, such as powdered dyes, pigments, adhesives, or the like, to produce dry compositions which may be brought into solution or stable suspension in cold water by simple mixing.

A further object is to provide a method of preparing the aforesaid cellulose ether compositions as dry, free-flowing, non-caking powders with an apparent density greater than that of the fibrous forms heretofore available, thus greatly facilitating storage, handling and shipping.

Yet another object is to provide a method whereby cold-water-soluble cellulose ethers, which normally exhibit gel formation in hot water, may be converted to compositions more easily dissolved in cold water than other forms of methyl cellulose heretofore available.

The foregoing and related objects are readily accomplished by suspending a fibrous cold-water-soluble cellulose ether in an aqueous solution of a particular class of a surface active agent maintained at a temperature above the gel formation temperature of the particular cellulose ether, and then driving off the excess water so as to give at least about 0.01 per cent, based on the weight of the cellulose ether, of the surface active agent in the dried product.

Although any cold-water-soluble fibrous cellulose ether, normally exhibiting gel formation in hot water, may be converted by the method of the present invention to a form easily dissolved in cold water without a preliminary hot water treatment, the description of the invention, for the sake of simplicity, will be limited to the preparation of methyl cellulose in such form.

Fibrous methyl cellulose, for use in the new process, may be obtained directly from an operation wherein methyl cellulose is made by etherification of alkali cellulose and washed with hot water to free it from water-soluble impurities, but previously purified and dried methyl cellulose may be remoistened and used in the present process. The resulting wet methyl cellulose may then be suspended in hot water at a temperature above the gel formation temperature, centrifuged rapidly to remove excess water, and sprayed with a solution of a suitable surface active agent during the centrifuging operation after which it may be dried. The product may be ground, if desired. The new cellulose ether composition may also be prepared by making a uniform slurry of from 1 to 5 per cent by weight of methyl cellulose in a hot solution of the surface active agent in water. The excess solution is subsequently removed, e. g., by pressing or by filtering under vacuum, so as to give at least about 0.01 per cent, based on the weight of methyl cellulose, of the surface active agent in the finally dried product. Although the methyl cellulose may be treated with a hot solution of a surface active agent in the above or equivalent manner at any temperature above the gel formation temperature of the particular methyl cellulose, the treatment is preferably carried out at least about 5° to 10° C. above the gel formation temperature, since by so doing a more uniform distribution of the surface active agent through the mass of the methyl cellulose appears to be obtained. The treatment with a hot solution may be carried out under super-atmospheric pressure if desired. The pressing, filtering or basket centrifuge treatment of the methyl cellulose mixture is carried out rapidly, and preferably above the gel formation temperature of the particular cellulose ether. The drying operation of the new methyl cellulose composition is also carried out preferably above the gel temperature. Carrying out the process above the gel temperature produces a composition of fibrous structure in its dry state which lends itself to satisfactory grinding operations. The fibrous product dissolves in water as rapidly as does the ground product, but is more difficult to handle, due to its bulk, in large scale operations.

The surface active agents which may be employed all contain the lauryl radical and are selected from the group consisting of lauryl alcohol and sodium lauryl sulfate. Other surface active agents have improved the solubility of methyl cellulose to a slight extent but the above preferred agents, when used as here described, impart outstandingly increased rates to the solution of methyl cellulose in cold water. In general, the concentration of the hot solution of the suitable surface active agent employed in treating the cellulose ether may be as low as 0.01 per cent or as high as 1 per cent. Higher concentrations may be used, but this sometimes produces a methyl cellulose composition in the form of a sticky mass, difficult to dry to a free-flowing, non-caking powder. The preferred concentration of the surface active agent in water, used to treat the cellulose ether, is from 0.1 to 0.5 per cent by weight, based on the amount of water used.

In a particular example, about 800 ml. of distilled water was heated to about 90° C. and 1 gram of sodium lauryl sulfate was added. The solution was agitated vigorously and to it was added 20 grams of fibrous methyl cellulose which had a gel point of 55° C., a methoxyl content of about 30 per cent and a viscosity rating of 1600 centipoises at 20° C. (Viscosity is measured on a 2 per cent aqueous solution of the methyl cellulose.) Agitation was continued for 5 minutes and while still hot, the suspension was rapidly filtered by suction. The partially dried cake, consisting of 31.5 per cent methyl cellulose and 68.5 per cent by weight of water and emulsifier, was further dried for 2 hours at 105° C. in an oven. The dry product was ground and passed through a screen before testing for solution rate. The new, dry methyl cellulose composition contained about 0.3 per cent by weight of sodium lauryl sulfate and was in the form of a free-flowing, non-caking powder which weighed 40 grams per 100 cubic centimeters.

A 1.5 gram sample of the so-produced dry methyl cellulose composition was added to 150 ml. of water at a temperature of about 13° to 20° C. and stirred at a uniform and standardized rate until complete solution of the sample had taken place. An apparently complete solution of the above composition was effected in 2 minutes. A 1.5 gram sample of the original untreated methyl cellulose, added in the same manner as above to 150 ml. of water (13°–20° C.), was stirred at the same uniform and standardized rate until complete solution of the sample had taken place. Complete solution of the untreated methyl cellulose required 1 to 2 hours.

In a second example, the same procedure was carried out as in Example 1 with the exception that 2 grams of sodium lauryl sulfate was added to the 800 ml. of water. This yielded a partially dried filter cake having a solution content of 66.5 per cent by weight. This was similarly dried for 2 hours at 105° C. The dry product was ground and passed through a screen before testing. The new, dry methyl cellulose composition contained 0.5 per cent by weight of sodium lauryl sulfate and was in the form of a free-flowing, non-caking powder, which weighed 40 grams per 100 cubic centimeters.

A 1.5 gram sample of the dry methyl cellulose composition was added to 150 ml. of water at a temperature of about 15° C. and was stirred at a uniform and standardized rate, as in Example 1, complete solution being effected in 2 minutes.

In a third example, the same procedure was carried out as in Example 1, with the exceptions that the methyl cellulose had a viscosity rating of 400 centipoises and that 1 gram of lauryl alcohol was added to the 800 ml. of water. This yielded a partially dried filter cake having a solution content of 46.7 per cent by weight. This was similarly dried for 2 hours at 105° C. The dry product was ground and passed through a screen before testing. The new, dry methyl cellulose composition contained about 0.15 per cent by weight of lauryl alcohol and was in the form of a free-flowing, non-caking powder, which weighed 40 grams per 100 cubic centimeters.

A 3 gram sample of the dry methyl cellulose composition was added to 150 ml. of water at a temperature of about 15° C. and was stirred at a uniform and standardized rate, as in Example 1, complete solution being effected in 10 minutes.

Although, as hereinbefore mentioned, the process of the present invention is applicable to the manufacture of a powdered composition easily dissolved in cold water from any cold-water-soluble cellulose ether, which gels in hot water, the process has particular utility when applied to the preparation of a powdered composition of the commercially available methyl cellulose of from 23 to 33 per cent methoxyl content. Such methyl cellulose is frequently prepared by methylating an alkali cellulose and isolating the methylated product from the reaction mixture in the form of a fibrous mass which is then washed with hot water. The washed fibrous mass may conveniently serve as a starting material of the present invention.

It may be mentioned that the process herein described may easily be adapted to continuous operation, since the steps involved are of a type lending themselves particularly to this mode of operation. A uniform product may thus be produced in quantity and at low cost.

This application is a continuation-in-part of our prior application Serial No. 129,512, filed November 25, 1949 now U. S. Patent No. 2,647,064.

We claim:
1. A method of treating a fibrous cold-water-soluble cellulose ether, which normally gels in hot water, to improve its rate of solution in cold water which comprises completely wetting the fibrous cellulose ether without dissolving it, at a temperature above the gel formation temperature of said ether, with an aqueous solution of from 0.01 to 1 per cent by weight of sodium lauryl sulfate, and drying the wet ether, containing an amount of the treating solution which holds from 0.01 to 1 per cent of the surface active agent, based on the weight of cellulose ether, at a temperature above the gel formation temperature of said ether.

2. A method of treating a fibrous cold-water-soluble cellulose ether, which normally gels in hot water, to improve its rate of solution in cold water which comprises completely wetting the fibrous cellulose ether without dissolving it, at a temperature above the gel formation temperature of said ether, with an aqueous solution of from 0.01 to 1 per cent by weight of sodium lauryl sulfate, drying the wet ether, containing an amount of the treating solution which holds from 0.01 to 1 per cent of the surface active agent, based on the weight of cellulose ether, at a temperature above the gel formation temperature of said ether, and grinding the dry product.

3. A method of treating methyl cellulose to improve its rate of solution in cold water which comprises completely wetting the methyl cellulose, without dissolving it, at a temperature above its gel formation temperature, with an aqueous solution of from 0.01 to 1 per cent by weight of sodium lauryl sulfate, and drying the wet methyl cellulose, containing an amount of the treating solution which holds from 0.01 to 1 per cent of the surface active agent, based on the weight of methyl cellulose at a temperature above the gel formation temperature of methyl cellulose.

4. A method of treating methyl cellulose to improve its rate of solution in cold water which comprises completely wetting the methyl cellulose, without dissolving it, at a temperature above its gel formation temperature, with an aqueous solution of from 0.1 to 0.5 per cent by weight of sodium lauryl sulfate, and drying the wet methyl cellulose, containing an amount of the treating solution which holds from 0.01 to 1 per cent of the surface active agent, based on the weight of methyl cellulose at a temperature above the gel formation temperature of methyl cellulose.

References Cited in the file of this patent

"The New Methocel," Dow Chemical Co., Midland, Mich. (1948), pages 23, 28 and 29.